Figure 1:
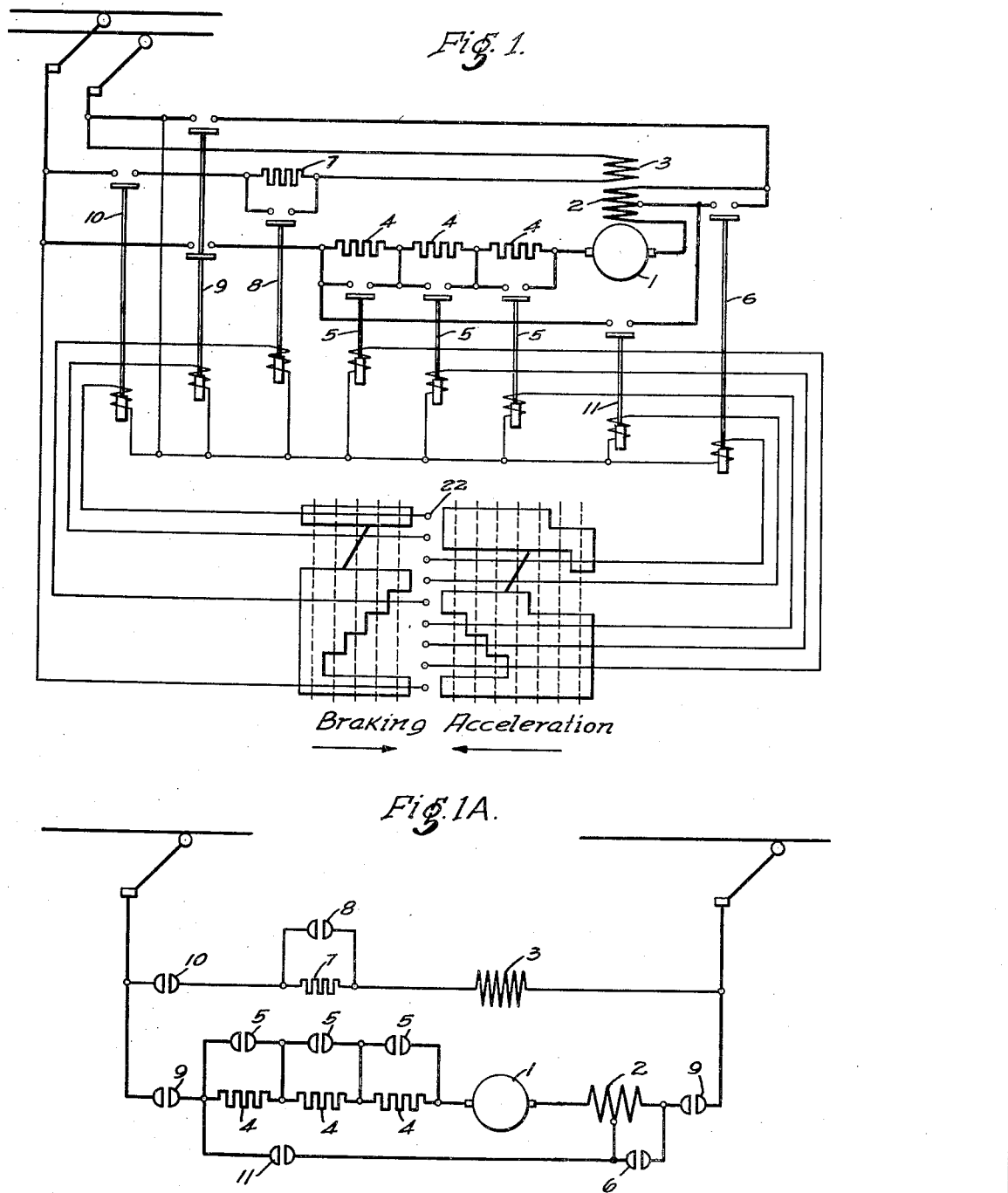

Nov. 7, 1939.   E. A. BINNEY ET AL   2,179,319
ELECTRIC TRACTION MOTOR CONTROL SYSTEM
Filed April 7, 1937   4 Sheets-Sheet 2

Braking   Acceleration

WITNESSES:
Michael Stark

INVENTORS.
Eric Alton Binney and
Paul Lester Mardis
BY
M. Crawford
ATTORNEY

Braking   Acceleration

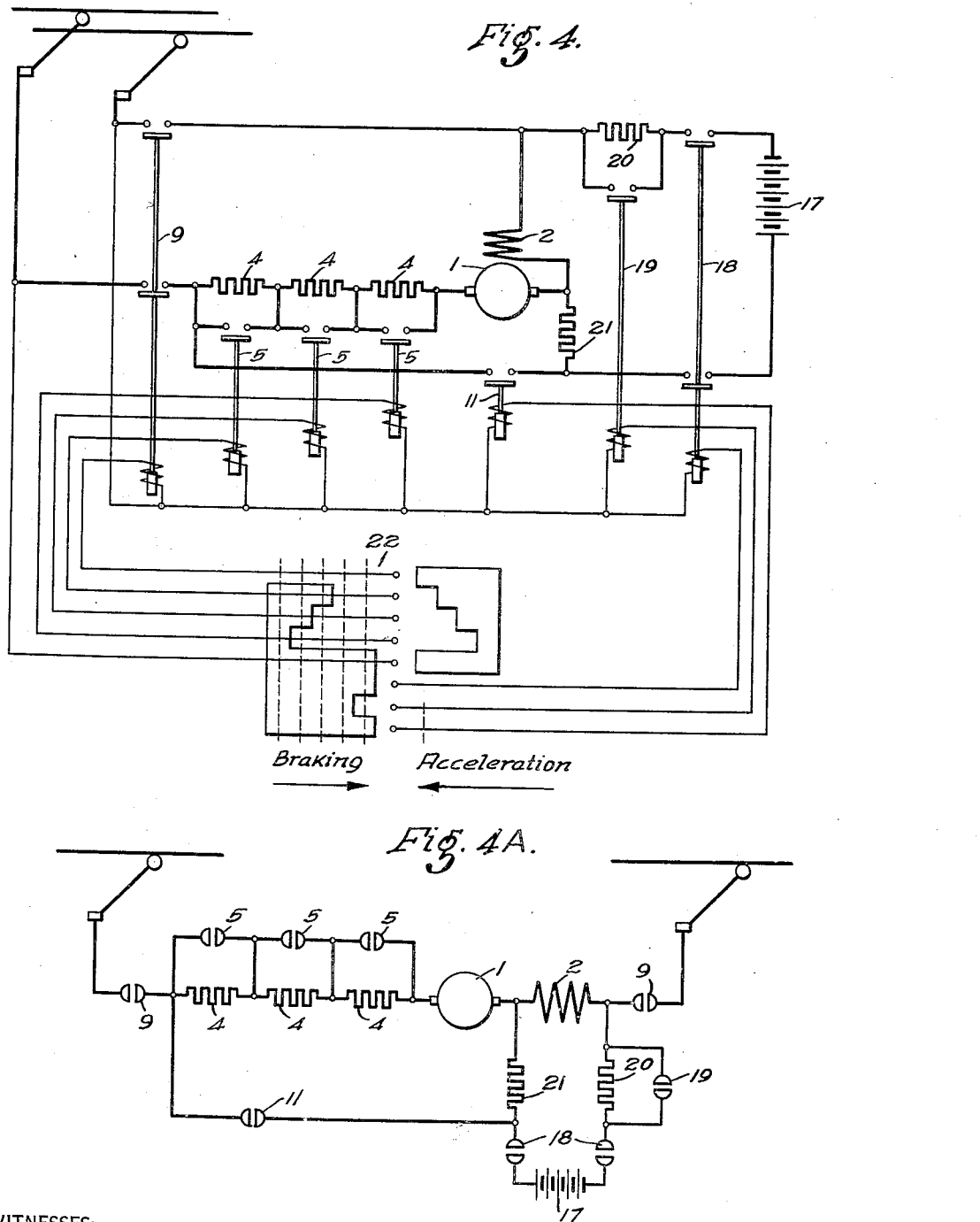

Patented Nov. 7, 1939

2,179,319

UNITED STATES PATENT OFFICE 2,179,319

ELECTRIC TRACTION MOTOR CONTROL SYSTEM

Eric Alton Binney and Paul Lester Mardis, Ilkley, England, assignors to The English Electric Company Limited, London, England, a company of Great Britain Application April 7, 1937, Serial No. 135,485 In Great Britain April 17, 1936

4 Claims. (Cl. 172—179)

This invention relates to the control, and more particularly to the rheostatic braking, of D. C. electric traction motors of the type having strong series field excitation and controlled by diverting resistances or like means for weakening these fields. Hitherto, electric braking of such motors, known as augmented series field motors, has been attended by considerable difficulties. Regenerative braking of series motors is generally impracticable and rheostatic braking has been difficult. The present invention is concerned with improved means for obtaining rheostatic braking of such motors, i. e., braking by disconnecting the armature from the supply and connecting across it a braking resistance which preferably consists of the starting resistance or includes some part thereof.

If during rheostatic braking the excitation be provided by reversing the series field winding and including it in the armature circuit, the variation of the excitation with the armature current results in the braking effort falling off substantially as the square of the armature current. In particular, with motors of the type having powerful series field windings and controlled by weakening these fields by short-circuiting sections of the winding or by connecting variable diverting resistances in parallel with the whole winding, the very powerful field winding results in an excessive initial braking effort which rapidly falls off during retardation of the motor to a value which may be quite inadequate.

With the object of obtaining, with series or compound wound motors, a much more satisfactory braking characteristic or even of obtaining a braking effort which will remain for a while substantially constant at a chosen value, the present invention consists in providing the motor with means for exciting it during rheostatic braking and for controlling the excitation independently of the armature current; this excitation may be the sole excitation during rheostatic braking or there may be superimposed thereon a further excitation varying inversely as the armature current. If any part of the series field winding is included in the armature circuit during rheostatic braking, it acts in opposition to the braking exciting winding so as to produce a resultant excitation which increases with decrease in armature current. The said braking excitation winding may be an auxiliary winding provided mainly for this purpose and it may then be energized from the ordinary supply to the motor. Alternatively, the series field winding itself or some part of it may be used and energized from an auxiliary supply such as a battery or an auxiliary generator. To keep down the bulk of the motor, it may be desirable in the former case to provide room for the auxiliary winding by omitting a few turns of the series winding, in which case the auxiliary winding may be used as a shunt field winding to augment the motor excitation at starting and at slow speeds when the motor will operate as a compound motor although, usually, it will run as a purely series motor at the higher speeds; the shunt field may also be available for providing a certain amount of regenerative braking although, in general, the invention is intended more particularly for cases where regenerative braking is not necessary or is even undesirable.

Four different forms of the invention are shown diagrammatically in Figures 1–4 of the accompanying drawings and schematic diagrams of the systems illustrated in Figs. 1 to 4 are shown in Figs. 1A to 4A, respectively.

In the preferred form of the invention shown in Fig. 1 and Fig. 1A, the propulsion and control equipment of an electric vehicle includes a D. C. motor with an armature 1, a powerful series field winding 2, which may be tapped at any desired point, and an auxiliary field winding 3, an armature starting resistance 4 and contactors 5 therefor, a contactor 6 for short-circuiting a section of the field winding 2, a contactor 8 for short-circuiting resistance 7 in series with the auxiliary field winding 3, main line contactors 9 and 10 in the armature and the auxiliary field circuits respectively, a rheostatic braking contactor 11 and a drum controller 22 for controlling the operation of the foregoing contactors. For starting the motor the contactors 9 are closed to connect the armature 1 across the line with all the series resistance 4 and the whole of the series field winding 2 in circuit. The auxiliary field winding 3 may also be connected directly across the line by closure of the contactors 8 and 10. For accelerating the motor the resistance 4 is cut out of circuit step by step by the contactors 5, the auxiliary field winding 3 is weakened by the insertion of the resistor 7 and then cut out of circuit by opening the contactor 10 and, lastly, contactors such as 6 are closed step by step to short-circuit sections of the series field winding 2 and so gradually weaken the motor excitation.

For rheostatic braking according to the invention the armature 1 is disconnected from the supply by opening the contactors 9 and the resistance 4 or some part thereof with or without the addition of extra resistance as may be required is connected across the armature terminals by closure of the rheostatic braking contactor 11. The auxiliary field winding 3 is reconnected across the line with the series resistance 7 in circuit; this resistance may be cut out in one or more steps by contactors such as 8 for strengthening the braking torque or maintaining the torque as the motor slows down. If provision be made for reversing the starting sequence of operations before applying rheostatic braking, contactors 8 and 10 being closed before the contactors 9 are opened and contactor 11 closed, a certain amount of regenerative braking may be obtained if desired.

If it be desired to increase the excitation during braking as the armature current decreases, with the object of maintaining a substantially constant braking effort, the series field or preferably a part thereof may be introduced in the armature circuit as a decompounding winding. This can readily be done by connecting one side of the braking contactor 11 to a tapping on the series field winding 2, as shown in Figs. 1 and 1A, instead of directly to the armature 1 as is the usual practice.

Figure 2:
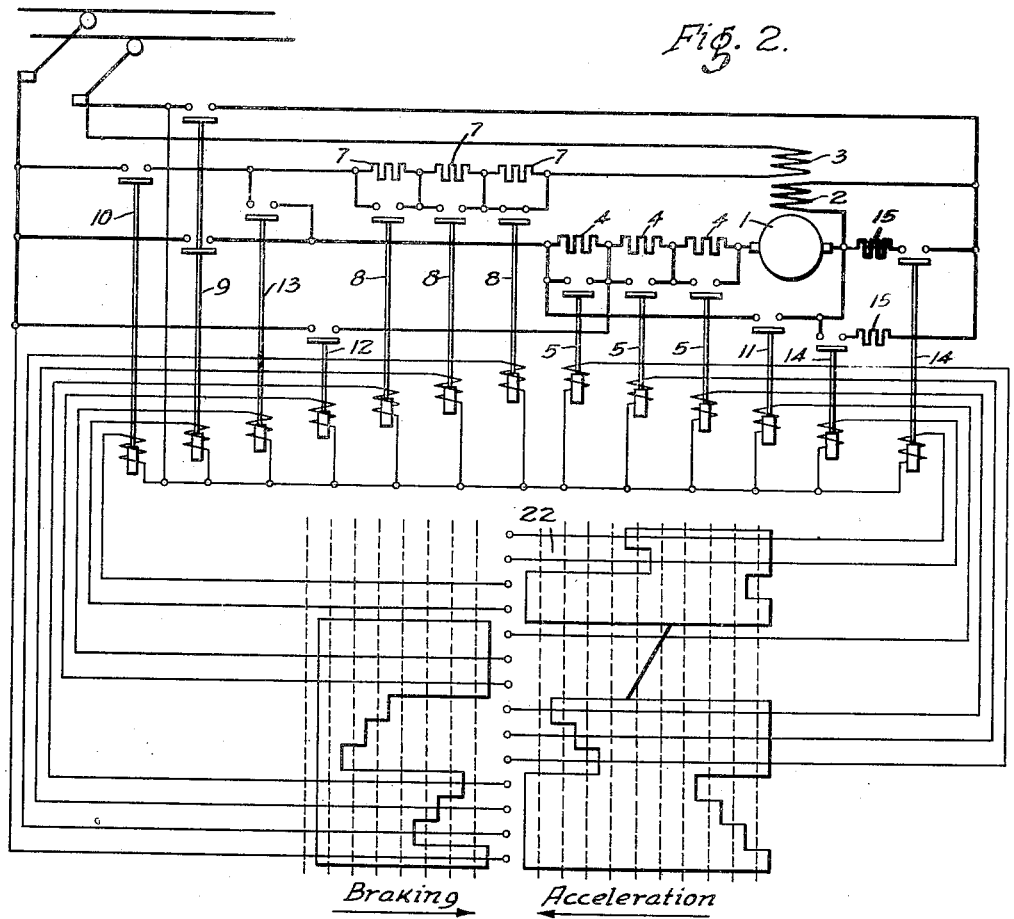
Figure 2A:
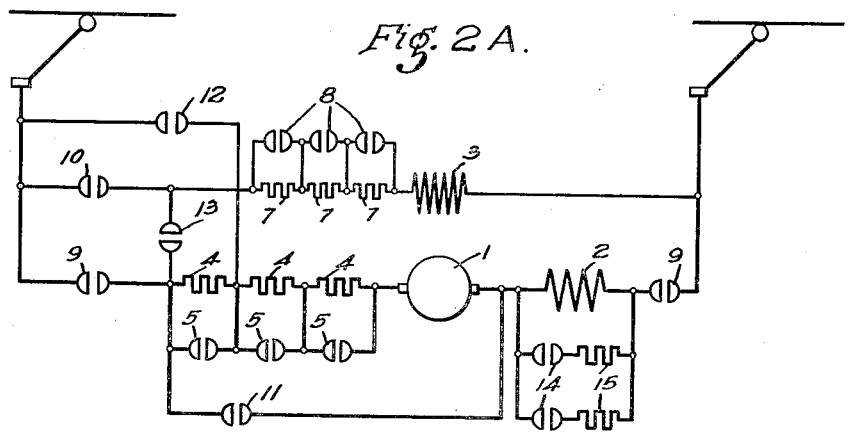

An effect similar to that described in the immediately preceding paragraph can be obtained without using the series field winding, by automatically strengthening the auxiliary field as the armature current decreases. This can be done by modifying the arrangement of Fig. 1 by the addition, as shown in Figs. 2 and 2A, of the contactors 12 and 13. When rheostatic braking is to be introduced the contactors 9 are opened and contactors 11, 12 and 13 closed. Contactor 12 connects one pole of the supply to a tapping on the starting resistance 4 while contactor 13 connects the end of this resistance to the resistance 7 in series with the auxiliary field winding 3. As a result a portion of the starting resistance 4 is included in the circuit across the line and through the auxiliary field winding 3, this portion of resistance then being common to both the field circuit and the braking circuit through the armature. As the armature current decreases the voltage drop across the common resistance decreases and accordingly the voltage across the auxiliary field winding increases. This figure also shows more than one contactor 8 for short-circuiting resistance 7 step by step and an untapped series field winding 2, the strength of which can be varied by successive closure of contactors 14 which introduce diverting resistances 15. It will be understood that diverter control of the series field winding can be employed with an arrangement otherwise exactly in accordance with Fig. 1 or that the preferred method of tapping the series field winding can be employed with the modification otherwise according to Fig. 2.

Figure 3:
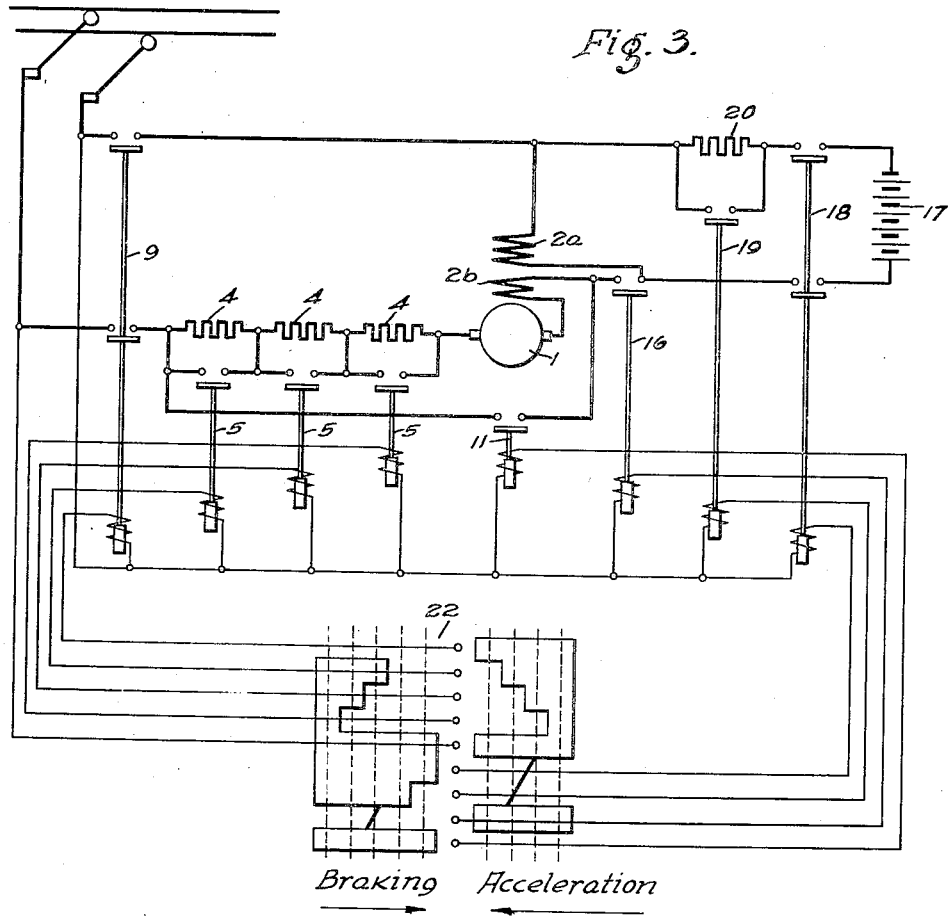
Figure 3A:
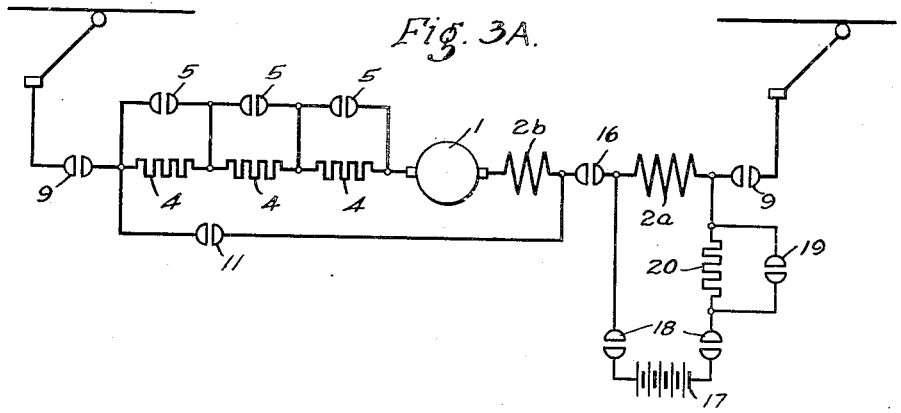

In a different form of the invention as shown in Fig. 3, the equipment includes no auxiliary field winding nor switches nor resistances therefor, but the series field winding is split into two sections 2a and 2b, usually unequal, between which is provided a contactor 16. There is also an auxiliary source of power which is shown as a battery 17 but may be an auxiliary generator acting as an exciter, together with contactors 18 for connecting this source to the larger field section 2a. For starting and accelerating the motor the armature 1, starting resistance 4, and the whole of the series field winding are all connected in series across the line by closure of contactors 9 and 16; the resistance 4 is then cut out step by step by contactors 5 and, lastly, the excitation weakened step by step. No means are shown in the figure for performing this latter operation but they may comprise either tapping contactors as described with reference to Fig. 1 or diverting resistance and contactors as described with reference to Fig. 2. For rheostatically braking the motor the contactors 9 and 16 are opened together with any field tapping or diverting contactors and the rheostatic braking contactor 11 is closed. The latter may be connected as shown so as to include the smaller section 2b of the series field winding in the closed circuit for the armature. The contactors 18 are closed to connect the auxiliary source of supply 17 to the winding 2a which produces the main braking excitation which is thus independent of armature current. If the whole or part of section 2b is included in circuit the resultant excitation will vary inversely as armature current. For increasing the braking effort and controlling it as desired, a contactor 19 may be disposed to shunt a resistor 20 included in series with the auxiliary supply 17 and, if desired, for further increasing the braking effort, the starting resistance 5 may be cut out step by step. It will be noted that with this arrangement braking may be obtained entirely independently of any failure of the main supply provided that the auxiliary supply is available.

A modification of the arrangement according to Fig. 3 is shown in Fig. 4 in which the auxiliary source of supply 17 can be connected by the contactors 18 across the whole of the series field winding 2 during rheostatic braking. Just as in the arrangement according to Fig. 3, the braking effort in this arrangement may be varied at will by the regulator 19 and resistor 20 in series with the auxiliary supply 17 as an addition or an alternative to variation by cutting the resistance 4 out of the armature circuit. Means, again not shown, are of course included for varying the series excitation of the motor during running. If it be desired that the excitation shall vary automatically and inversely as the armature current, a resistance 21 is connected, as shown, so as to be common to both the armature circuit and that of the series field winding and the auxiliary supply 17; as the armature current decreases the voltage drop across this resistance 21 also decreases and hence the voltage across the winding 2 rises.

It will be appreciated that the scheme according to Figs. 3 and 4 may be applied to compound wound motors, the shunt field winding being either disconnected during rheostatic braking or utilized as an additional source of excitation, but in general with compound motors the shunt field winding will be used as the sole source of excitation independent of armature current during braking. Such arrangements, however, together with other modifications of the above schemes obtained by combining features of one with feature of another are to be understood as coming within the scope of the invention.

We claim as our invention:

1. The combination with a direct current motor having an armature winding and a series field winding, of means for connecting the motor armature in a closed circuit for rheostatic braking, switching means for separating a part of the series field winding of the motor from the armature and the rest of the series field winding, and means for connecting said separated portion to an independent source of supply during braking, the remaining portion of the series field winding being energized by the armature current during braking.

2. The combination with a direct current motor having an armature winding and a series field winding, of means for connecting the motor armature in a closed circuit for rheostatic braking, switching means for separating a part of the series field winding of the motor from the armature and the rest of the series field winding, means for connecting said separated portion to an independent source of supply during braking, and means for varying the voltage across the terminals of said separated portion to regulate the rheostatic braking, the remaining portion of the series field winding being energized by the armature current during braking.

3. The combination with a direct current motor having an armature winding and a field winding, of means for connecting the motor armature in a closed circuit for rheostatic braking, means for controllably exciting the motor from a source independent of the motor armature voltage and current during such braking, and means for superimposing on the independent excitation during braking a further excitation varying inversely as the armature current.

4. The combination with a direct current motor having an armature winding and a series field winding, of means for connecting the motor armature in a closed circuit for rheostatic braking, switching means for separating a part of the series field winding of the motor from the armature and the rest of the series field winding, and means for connecting said separated portion to an independent source of supply during braking, said closed circuit through the armature during rheostatic braking including a part of the series field winding in such a manner as to oppose the independent excitation.

ERIC ALTON BINNEY.
PAUL LESTER MARDIS.